United States Patent
Smolenski et al.

(10) Patent No.: US 7,307,246 B2
(45) Date of Patent: Dec. 11, 2007

(54) SYSTEM AND METHOD OF DETECTING TEMPERATURE OF A COOKING UTENSIL OVER A RADIANT COOKTOP

(75) Inventors: Joseph Lucian Smolenski, Slingerlands, NY (US); Harry Kirk Mathews, Jr., Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 171 days.

(21) Appl. No.: 10/878,067

(22) Filed: Jun. 28, 2004

(65) Prior Publication Data

US 2005/0286609 A1    Dec. 29, 2005

(51) Int. Cl.
*H05B 1/02* (2006.01)
(52) U.S. Cl. .............. 219/497; 219/448.11; 219/446.1; 219/483
(58) Field of Classification Search ........... 219/448.11, 219/446.1, 483–488, 494, 497, 502, 499, 219/505; 99/325–331
See application file for complete search history.

(56) References Cited

U.S. PATENT DOCUMENTS

| 4,237,368 | A |   | 12/1980 | Welch ..................... 219/449 |
| 4,740,664 | A |   | 4/1988  | Payne et al. ............. 219/449 |
| 4,851,645 | A | * | 7/1989  | Wolf et al. ............ 219/448.17 |
| 5,919,385 | A | * | 7/1999  | Kersten et al. ........ 219/448.11 |
| 6,462,316 | B1 | * | 10/2002 | Berkcan et al. ............ 219/502 |
| 6,752,531 | B2 | * | 6/2004  | McWilliams ............... 374/149 |
| 6,753,509 | B2 | * | 6/2004  | Grätz et al. ............ 219/448.17 |

* cited by examiner

*Primary Examiner*—Mark Paschall
(74) *Attorney, Agent, or Firm*—Fletcher Yoder

(57) ABSTRACT

A system for detecting temperature of a cooking utensil over a radiant cooktop includes a cooktop having an upper surface and a lower surface and a radiant heating element adapted to heat the cooktop. A temperature detector is disposed adjacent the lower surface of the cooktop and is adapted to detect temperature of the lower surface of the cooktop. The system also includes a thermal insulation barrier disposed intermediate the temperature detector and the radiant heating element.

35 Claims, 5 Drawing Sheets

SYSTEM AND METHOD OF DETECTING TEMPERATURE OF A COOKING UTENSIL OVER A RADIANT COOKTOP

BACKGROUND

The invention relates generally to the field of radiant cooktop appliances and more particularly, to temperature measurement and control system for such cooktops.

Various types of cooking appliances employ radiant cooktops such as, glass-ceramic cooktops. Such cooktops have advantages such as pleasing appearance and easy cleanability. In conventional radiant cooktop appliances, a cooktop is heated by radiation from heating units located below the cooktop. The heat is conducted from the cooktop surface to a cooking utensil placed over the cooktop surface for performing the cooking activities. For controlling the cooking features of cooking appliances with radiant cooktops, it may be useful to measure the temperature of the cooking utensil placed over the cooktop, such as a pot or pan.

Many specific techniques have been developed and are in use for measurement of the temperature of a cooking utensil over radiant cooktops. For example, in some systems, a temperature sensor coupled to the cooking utensil measures the temperature of the cooking utensil. However, such techniques require holes to be drilled through the cooktop surface to facilitate contact between the temperature sensor and the cooking utensil, resulting in reduced cleanability, one of the key attractive features of radiant cooktops.

Certain other systems presume the temperature of the underside of the cooktop surface as a measure of the temperature of the cooking utensil. This technique does not provide accurate estimation of the temperature of the cooking utensil, as it does not take into account the variability of the temperature drop across the cooking utensil and the surface of the cooktop. Such variation in the temperature drop occurs due to the varying thermal resistance of the interface between the cooking utensil and the surface of the cooktop that is dominated with the air gap between the cooking utensil and the absorption properties of the cooking utensil.

Therefore, it would be desirable to develop a technique for a substantially accurate temperature measurement of a cooking utensil placed over a radiant cooktop. Furthermore, it would be advantageous to control operation, such as power input to the radiant cooktop, based upon such temperature measurement data.

BRIEF DESCRIPTION

Briefly, in accordance with one aspect of the present invention a system for detecting temperature of a cooking utensil over a radiant cooktop includes a cooktop having an upper surface and a lower surface and a radiant heating element adapted to heat the cooktop. A temperature detector is disposed adjacent the lower surface of the cooktop and is adapted to detect temperature of the lower surface of the cooktop. The system also includes a thermal insulation barrier disposed intermediate the temperature detector and the radiant heating element.

In accordance with another aspect of the present invention a method of detecting a temperature of a cooking utensil over a radiant cooktop includes disposing a temperature detector adjacent a lower surface of a cooktop and creating an area of reduced heat flux adjacent the temperature detector. The method also includes sensing the temperature of the area of reduced heat flux via the temperature detector.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
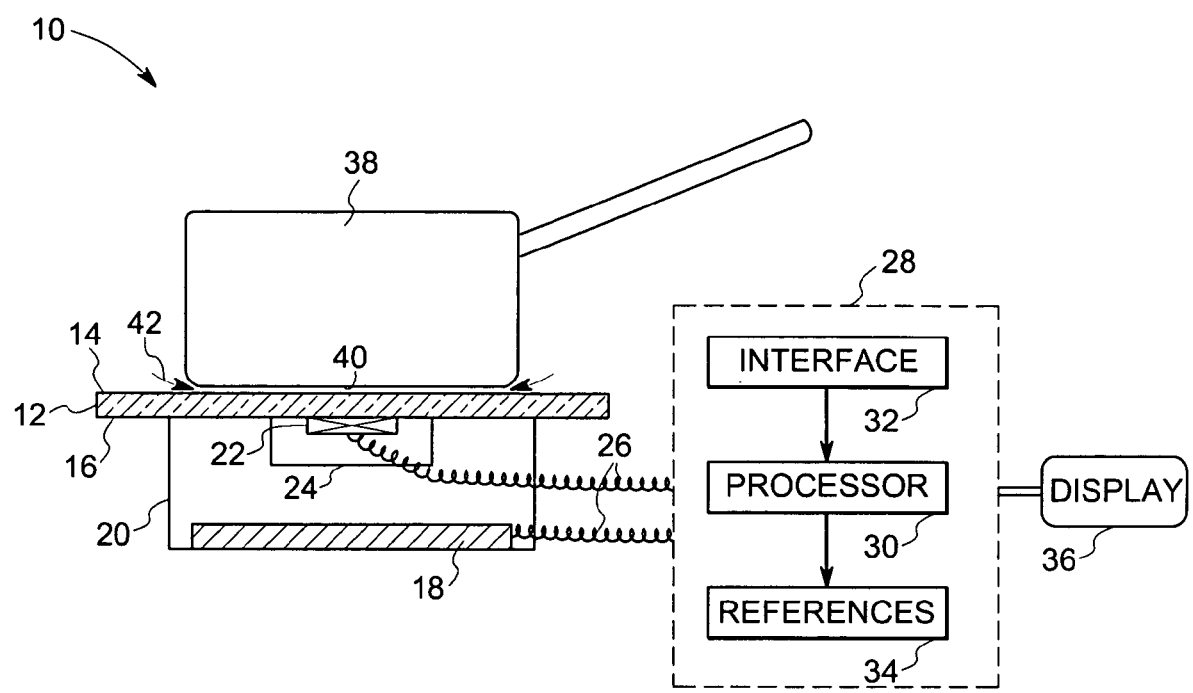
FIG. 1 is a diagrammatical representation of an exemplary temperature detection system for use in a cooking appliance with radiant cooktop according to one aspect of invention.

Turning now to the drawings and referring first to FIG. 1 a temperature detection and control system 10 for temperature detection and control over a radiant cooktop 12 is illustrated. In the illustrated embodiment, the system 10 comprises a radiant cooktop 12 with an upper surface 14 and a lower surface 16. Any suitable material may be used for the cooktop. In one embodiment, the cooktop comprises a ceramic material. In another embodiment, the cooktop comprises a glass material. The cooktop 12 is heated via a radiant heating element 18 that is disposed within a housing 20. In addition, a temperature detector 22 is disposed adjacent the lower surface 16 of the cooktop 12. A thermal insulation barrier 24 is disposed intermediate the temperature detector 22 and the radiant heating element 18 to insulate the temperature detector 22. In one embodiment, the temperature detector 22 comprises a resistive thermal device. In another embodiment, the temperature detector 22 comprises a thermistor. Any suitable temperature detector may be employed as described below.

Further, the temperature detector 22 and the radiant heating element 18 have connection leads 26 which couple the temperature detector 22 and the radiant heating element 18 to a controller 28 for active control of the cooktop 12 based upon the measured temperature via the temperature detector 22. The controller 28 comprises of a processor 30, an interface 32 and references 34 that will be described in detail hereinafter. Additionally, the controller 28 is coupled to a display 36 to make the different options indicating the status of the cooktop control available to a user of the system 10.

The temperature detector 22 is adapted to measure a temperature of the lower surface 16 of the cooktop 12, the measured temperature being representative of the temperature of a cooking utensil 38 (e.g. a pot or pan) disposed over the upper surface 14 of the cooktop 12. In operation, the insulation barrier 24 reduces the variability in the temperature measurement of the temperature of the cooking utensil 38 that may be caused because of the varying thermal resistance across a bottom surface 40 of the cooking utensil 38 and the upper surface 14 of the cooktop 12. Such variation in the thermal resistance is a function of the thermal resistance of an air gap 42 extending between the bottom surface 40 of the cooking utensil 38 and the upper surface 14 of the cooktop 12. The present technique offers enhancement of the accuracy of the temperature measurement by insulating the temperature detector 22 to reduce the heat flow through the interface between the cooktop 12 and the cooking utensil 38. As a result, the sensitivity of the temperature measurement to temperature drop resulting from the variable thermal resistance of the air gap 42 is reduced, thus enabling the temperature measurement of the lower surface 16 of the cooktop 12 to be a substantially accurate estimation of the temperature of the cooking utensil 38 disposed over the cooktop 12.

Figure 2:
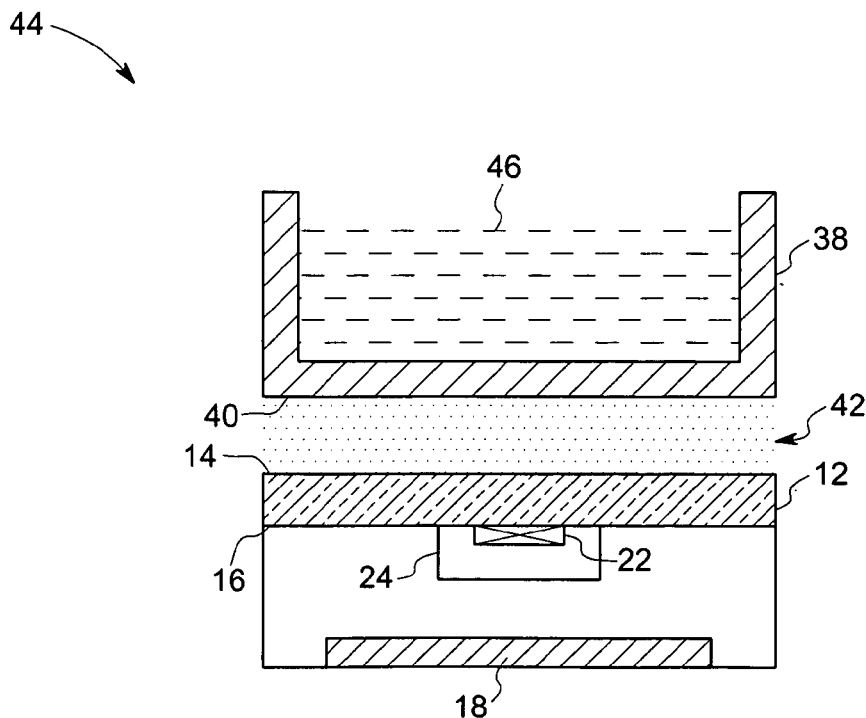
FIG. 2 is a diagrammatical representation of the various interfaces of the system of FIG. 1.

FIG. 2 represents diagrammatically various thermal interfaces 44 of the system of FIG. 1. In a presently contemplated configuration, heat from the radiant heating element 18 is radiated via the air gap 42 between the upper surface 14 of the cooktop 12 and the lower surface 40 of the cooking utensil 38. Subsequently, this heat is conducted through the surface of the cooking utensil 38 to contents 46 of the cooking utensil 38 and is finally dissipated into the surrounding air. The thermal resistance of the various thermal interfaces 44 as shown in FIG. 2 may be estimated through an electrical equivalent circuit 50 as shown in FIG. 3.

Figure 3:
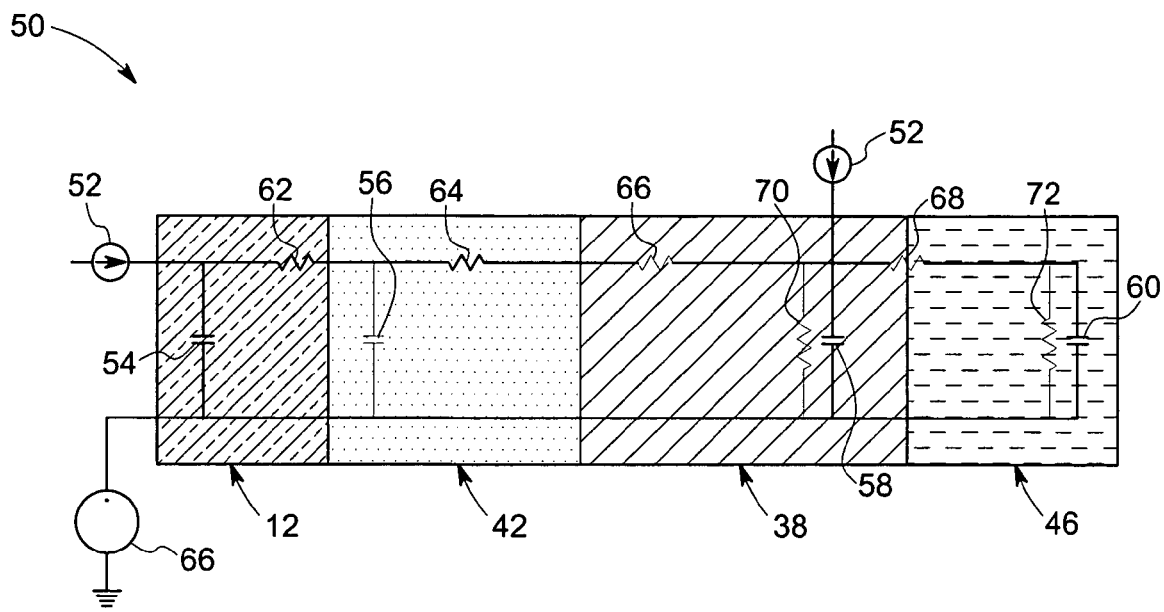
FIG. 3 is a diagrammatical illustration of the equivalent circuit for estimation of thermal resistance for the various interfaces of system of FIG. 2.

The electrical equivalent circuit 50 as shown in the FIG. 3 comprises of four adjoining interfaces that includes, the surface of cooktop 12, the air gap 42 between the cooktop 12 and the cooking utensil 38, the surface of cooking utensil 38 and the contents 46 of the cooking utensil. As can be seen, the equivalent circuit 50 comprises of a power source 52 that is adapted to provide heat or energy to the first interface, which is the surface of the cooktop 12. In the illustrated embodiment, the power source is the radiant heating element 18 (not shown here) adapted to heat the cooktop 12. Further, capacitances of interfaces 12, 42, 38 and 46 are denoted generally by reference numerals 54, 56, 58 and 60 respectively. In addition, resistance of interfaces 12, 42, 38 and 46 denoted generally by reference numerals 62, 64, 66 and 68 respectively are placed in series in the equivalent circuit 50. It should also be noted that, the circuit 50 comprises a resistance 70 and a resistance 72 that are coupled in parallel to account for the heat conducted through the cooking utensil 38 and the contents 46 of the cooking utensil 38. In general, resistance 66, resistance 70, resistance 72 and capacitance 56 do not have significant effect on the estimation of the temperature of the cooking utensil 38.

As can be seen, the temperature of the cooking utensil 38 may be estimated through the temperature of the cooktop 12 and the thermal resistance 66 of the air gap 42. In this embodiment, the temperature of the cooking utensil 38 is estimated to be equivalent to the temperature of the upper surface 14 of the cooktop 12 as the variability of the temperature drop across the air gap 42 is reduced due to the insulation of the temperature detector 22 as discussed earlier.

Figure 4:
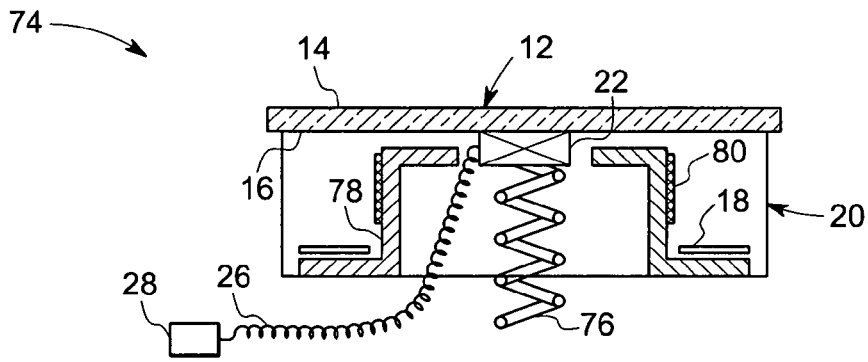
FIG. 4 is a diagrammatical representation of an exemplary temperature detection system for use in a cooking appliance with a radiant cooktop according to one embodiment of invention.

FIG. 4 illustrates an exemplary temperature detection system 74 with spring loaded sensor assembly for use in a cooking appliance with radiant cooktop 12 according to one embodiment of invention. The system 74 comprises of the temperature detector 22 that is coupled to the lower surface 16 of the cooktop 12 via a spring assembly 76. The temperature detector 22 with the spring assembly 76 may be built into the design of the cooktop 12. In operation, the spring assembly 76 urges the temperature detector 22 towards the lower surface 16 of the cooktop 12 to achieve a contact between the temperature detector 22 and the lower surface 16 of the cooktop 12 for accurate temperature measurement of the lower surface 16.

In addition, an insulating wall 78 is disposed adjacent the temperature detector 22 with the spring assembly 76 to reduce a heat flux adjacent the temperature detector 22. The insulating wall 78 comprises a material that is compliant with the material of the cooktop 12. In one embodiment, the insulating wall 78 comprises fiberglass. In another embodiment, the insulating wall 78 comprises ceramic. Moreover, a radiant shield 80 is disposed over the insulating wall to reduce the heat flow to the temperature detector 22 from the rest of the area within the burner housing 20. As described earlier the temperature detected by the temperature detector 22 in the system 74 may be used for controlling a feature of the cooktop 12 via the controller 28 as will be described in a greater detail below.

Figure 5:
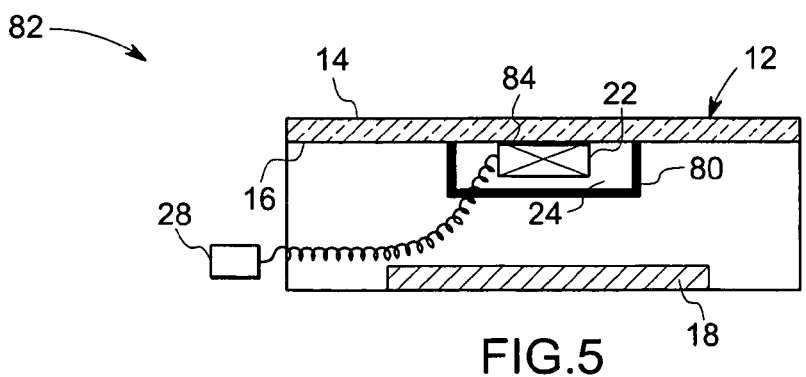
FIG. 5 is a diagrammatical representation of an exemplary temperature detection system for use in a cooking appliance with a radiant cooktop according to another embodiment of invention.

As will be appreciated by those skilled in the art, a great number of variations may be devised for insulating the temperature detector 22 for accurate measurement of temperature of the cooking utensil 38 over the radiant cooktop 12. FIG. 5 illustrates an exemplary temperature detection system 82 according to another embodiment of the invention. In a present configuration, the temperature detector 22 is bonded to the cooktop 12 via a bonding material 84. The bonding material may comprise a glue, though other materials with suitable adhesion properties may be used. Further, the thermal insulation barrier 24 is provided adjacent the temperature detector 22. In addition, the radiant shield 80 may be disposed adjacent the thermal insulation barrier 24. In this embodiment, the radiant shield 80 comprises gold though other materials with the desired shielding properties may be used.

Figure 6:
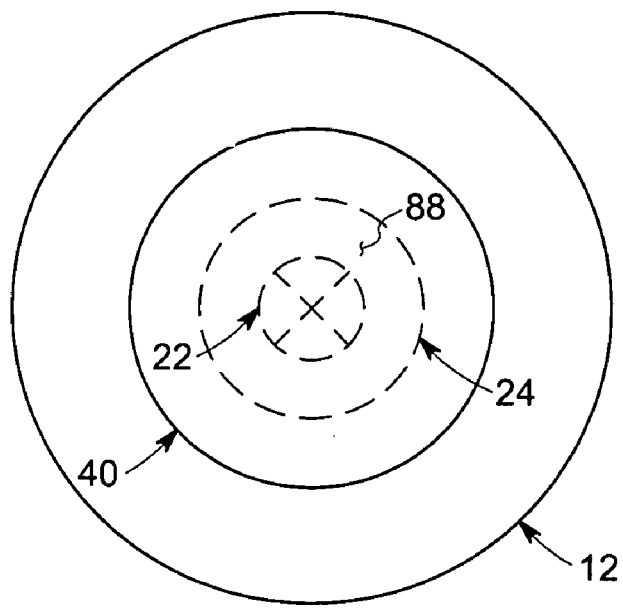
FIG. 6 is the top plan view of the temperature detection system of FIG. 1.

FIG. 6 shows a top plan view of the temperature detection system 82 of FIG. 5. As can be seen, an area 88 of low heat flux is created intermediate the temperature detector 22 and the insulating barrier 24 that reduces the heat flow through the lower surface 40 of the cooking utensil 38 and the cooktop 12. As a result, the variability of the temperature drop across the interface between the cooking utensil 38 and the cooktop 12 is reduced. Thus, the temperature of the cooktop 12 gives a substantially accurate measurement of the temperature of the lower surface 40 of the cooking utensil 38.

Figure 7:
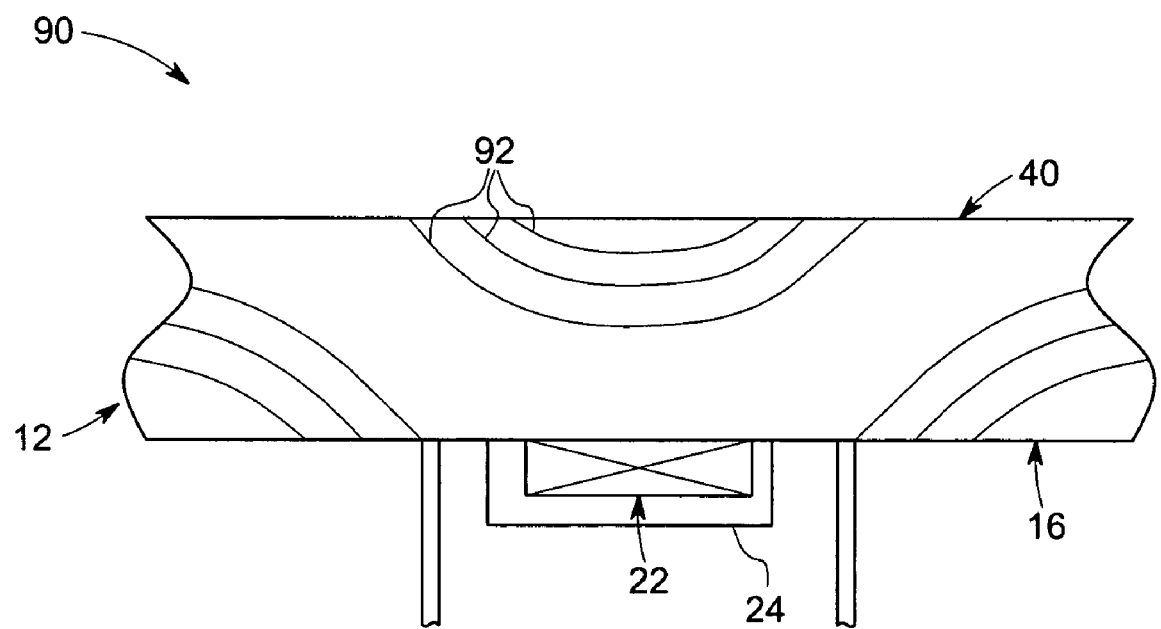
FIG. 7 is a graphical representation of an exemplary temperature distribution for the interface between the cooking utensil and the lower surface of the cooktop for the system of FIG. 2.

FIG. 7 is a graphical representation of an exemplary temperature distribution 90 across interface between the lower surface 40 of the cooking utensil 38 and the lower surface 16 of the cooktop 12 with the temperature detector 22 in accordance with the aspects of the present invention. As can be seen from temperature profiles 92, the insulation barrier 24 that is disposed adjacent the temperature detector 22 reduces heat flow through the lower surface 40 of the cooking utensil 38 (not shown here) and the lower surface 16 of the cooktop 12. As a result, the temperature of the lower surface 16 of the cooktop 12 is a representative of the temperature of the lower surface 40 of the cooking utensil 38.

Figure 8:
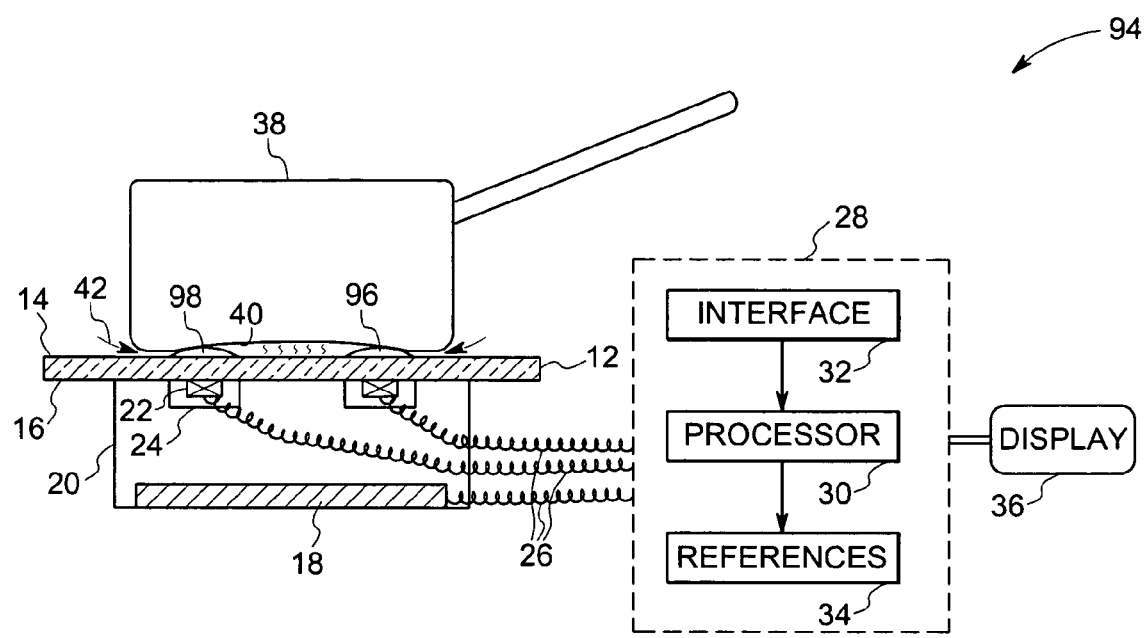
FIG. 8 is a diagrammatical representation of an exemplary temperature detection system for use in a cooking appliance with a radiant cooktop with raised locations over the cooktop to facilitate monitoring of utensil temperature.
Figure 9:
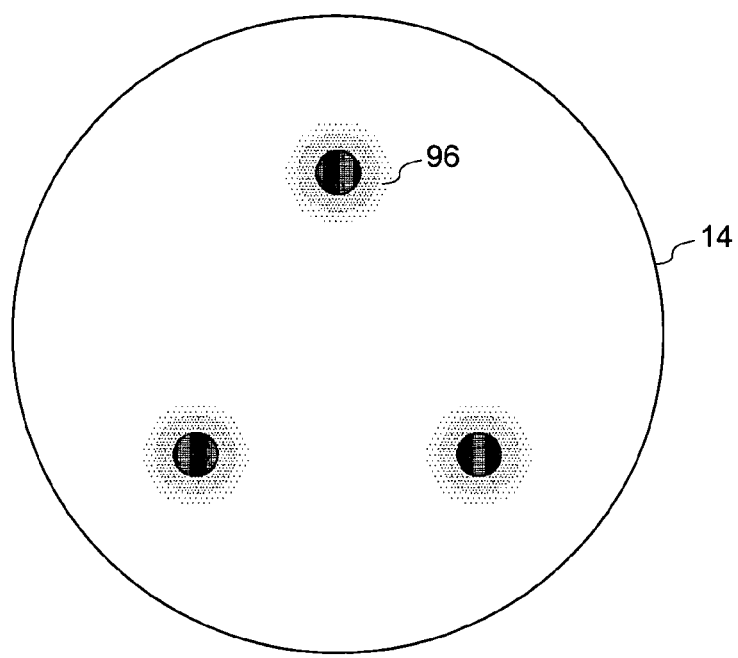
FIG. 9 is a top plan view of the cooktop of the system of FIG. 8.

FIG. 8 and FIG. 9 illustrate a further embodiment 94 to facilitate monitoring of the temperature of the cooking utensil 38 over the radiant cooktop 12. In a presently contemplated configuration 94, the upper surface 14 of the cooktop 12 comprises a plurality of raised locations 96 adapted to provide contact between the upper surface 14 of the cooktop 12 and the cooking utensil 38 disposed over the upper surface 14 of the cooktop 12. In one embodiment, a minimum number of raised locations 96 are three as shown in the top plan view of the cooktop 12 in FIG. 9. In the present configuration, a temperature detector 22 is disposed adjacent to each of the raised locations 96 that enables measurement of temperature adjacent at least one out of the three locations where the lower surface 40 of the cooking utensil 38 is in contact with the raised location 96. Alternatively, a single detector arrangement may be provided adjacent to only one of the raised locations.

In addition, the insulation barrier 24 is disposed adjacent each of the temperature detector 22. Further, the controller 28 is coupled to each of the temperature detector 22 and the radiant heating element 18 via leads 26 to control the temperature of the radiant cooktop 12 based upon the temperature detected by the temperature detector 22. The controller 28 is configured to control the temperature of the radiant cooktop 12. Additionally, the controller 28 is operable to control a cooking feature of the cooktop 12. In one embodiment, the cooking feature is boil detection of contents placed inside the cooking utensil 38 disposed over the upper surface 14 of the cooktop 12. In another embodiment, the cooking feature is boil control of contents placed inside the cooking utensil 38 disposed over the upper surface 14 of the cooktop 12. In some embodiments, the cooking feature is a no-load condition of the radiant cooktop 12. The control of such features in response to the detected temperature via the temperature detector 22 will be discussed in detail hereinafter.

The interface 32 of the controller 28 facilitates the interface between the controller 28 and components of the cooktop 12 such as, the temperature detector 22 and the radiant heating element 18. Further, the processor 30 is adapted to receive temperature data from the temperature detector 22 and to operate the cooktop 12 to control cooking features of the cooktop 12. The references 34 may be utilized by the processor 30 to decide operational parameters for the cooktop 12. The operational parameters for the cooktop 12 may include, but are not limited to, power setting of the radiant heating element 18 and time for heating the radiant cooktop 12 via the radiant heating element 18. In addition, the display 36 may be utilized to observe different display options indicating the status of such operational parameters of the radiant cooktop 12.

Figure 10:
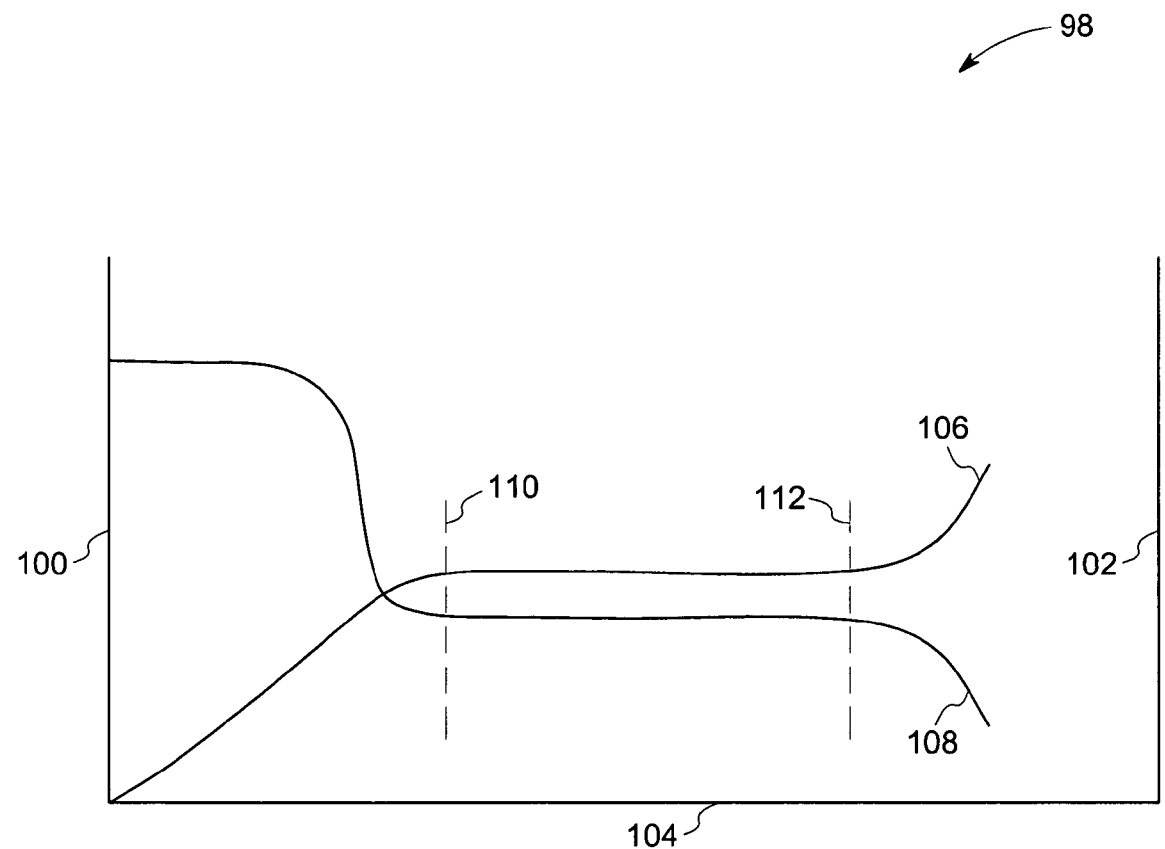
FIG. 10 is a graphical representation of certain exemplary control settings employed by system of FIG. 1 for controlling a cooking feature of a cooking appliance with radiant cooktop.

FIG. 10 illustrates certain exemplary control settings 98 employed by the temperature detection and control system of FIG. 1 for controlling cooking features of a cooking appliance with radiant cooktop. The ordinate axes 100 and 102 represent a temperature of the radiant cooktop 12 and power setting of the radiant cooktop 12 respectively. The abscissa axis 104 represents the time of operating the cooktop 12. The profiles 106 and 108 illustrate the control for temperature and the power input respectively for controlling cooking features of the cooktop 12. In one embodiment, 110 represents the boil detection feature where on detection of a boiling condition of contents heated through the cooktop 12, the power input applied to the radiant heating element may be lowered via the controller for boil control of the contents. In another embodiment the boil dry feature represented by a reference numeral 112 where a condition of heating of an empty utensil, such as typically may result from the evaporation of the contents of the utensil is detected and the temperature and power input of the cooktop 12 are adjusted to reduce the temperature of the utensil.

Certain other features of the cooktop may be controlled based upon the temperature detected over the radiant cooktop, for example, the no-load condition of the cooktop 12 where the heating unit of cooktop 12 is operated with no utensil present over the cooktop may be controlled by adjusting the power input so that the utensil is not over heated. As noted above, the various aspects of the method described hereinabove have utility in cooking appliances with radiant cooktop. The method described here is advantageous for such systems for substantially accurate temperature measurement of the temperature of a cooking utensil over the cooktop and controlling the features of the cooktop based upon such temperature measurement data.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for detecting temperature of a cooking utensil over a radiant cooktop comprising:
    a cooktop having an upper surface and a lower surface;
    a radiant heating element adapted to heat the cooktop;
    a temperature detector disposed adjacent the lower surface of the cooktop and adapted to detect temperature of the lower surface of the cooktop;
    a thermal insulation barrier disposed intermediate the temperature detector and the radiant heating element, wherein the thermal insulation barrier is configured to shield a portion of the cooktop from the radiant heating element and create an area of reduced heat flux in the cooktop; and
    a plurality of raised locations disposed on the upper surface of the cooktop adapted to provide contact between the upper surface of the cooktop and a cooking utensil disposed over the upper surface of the cooktop.

2. The system of claim 1, wherein the temperature of the lower surface of the cooktop is a representative of the temperature of a cooking utensil disposed over the upper surface of the cooktop.

3. The system of claim 1, wherein the cooktop comprises a ceramic material.

4. The system of claim 1, wherein the cooktop comprises a glass material.

5. The system of claim 1, wherein the temperature detector is a resistive thermal device.

6. The system of claim 1, wherein the temperature detector is a thermistor.

7. The system of claim 1, wherein the temperature detector is bonded to the lower surface of the cooktop.

8. The system of claim 1, wherein the temperature detector comprises a spring loaded sensor assembly for urging the temperature detector towards the lower surface of the cooktop.

9. The system of claim 1, wherein the thermal insulation barrier comprises a material compliant with the material of the cooktop.

10. The system of claim 1, wherein a radiant shield is disposed over the thermal insulation barrier.

11. The system of claim 10, wherein the radiant shield comprises gold.

12. The system of claim 1, wherein a minimum number of the raised locations is three.

13. A system for controlling operation of a radiant cooktop comprising:
   a cooktop having an upper surface and a lower surface;
   a radiant heating element adapted to heat the cooktop;
   a temperature detector disposed adjacent the lower surface of the cooktop adapted to detect temperature of the lower surface of the cooktop;
   a thermal insulation barrier disposed intermediate the temperature detector and the radiant heating element;
   a controller coupled to the temperature detector and the radiant heating element for controlling temperature of the radiant cooktop based upon the temperature detected by the temperature detector; and
   a plurality of raised locations disposed on the upper surface of the cooktop adapted to provide contact between the upper surface of the cooktop and a cooking utensil disposed over the upper surface of the cooktop.

14. The system of claim 13, wherein the temperature of the lower surface of the cooktop is a representative of the temperature of the cooking utensil disposed over the upper surface of the cooktop.

15. The system of claim 13, wherein the temperature detector is bonded to the lower surface of the cooktop.

16. The system of claim 13, wherein the temperature detector comprises a spring loaded sensor assembly for urging the detector towards the lower surface of the cooktop.

17. The system of claim 13, wherein a radiant shield is disposed over the thermal insulation barrier.

18. The system of claim 13, wherein a minimum number of the raised locations is three.

19. The system of claim 13, wherein the controller is operable to control a cooking feature of the cooktop.

20. The system of claim 19, wherein the cooking feature is boil detection of contents placed inside a cooking utensil disposed over the upper surface of the cooktop.

21. The system of claim 19, wherein the cooking feature is boil control of contents placed inside a cooking utensil disposed over the upper surface of the cooktop.

22. The system of claim 19, wherein the cooking feature is a no-load condition of the radiant cooktop.

23. A method of detecting a temperature of a cooking utensil over a radiant cooktop comprising:
   disposing a temperature detector adjacent to a lower surface of a cooktop;
   creating an area of reduced heat flux in the cooktop; and
   sensing the temperature of the area of reduced heat flux via the temperature detector by providing contact between an upper surface of the cooktop and a cooking utensil disposed on the upper surface of the cooktop via a plurality of raised locations disposed on the upper surface of the cooktop.

24. The method of claim 23, wherein the temperature detector is bonded to the lower surface of the cooktop.

25. The method of claim 23, wherein the temperature detector is biased towards the lower surface of the cooktop via a resilient sensor assembly.

26. The method of claim 23, wherein creating an area of reduced heat flux comprises providing an insulation barrier adjacent to the temperature detector.

27. The method of claim 26, further comprising disposing a radiant shield over the thermal insulation barrier.

28. The method of claim 23, wherein a minimum number of the raised locations is three.

29. A method of controlling operation of a radiant cooktop comprising:
   disposing a temperature detector adjacent a lower surface of a cooktop;
   creating an area of reduced heat flux in the cooktop;
   sensing a temperature of the area of reduced heat flux via the temperature detector by providing contact between an upper surface of the cooktop and a cooking utensil disposed on the upper surface of the cooktop via a plurality of raised locations disposed on the upper surface of the cooktop; and
   controlling the temperature of the cooktop based upon the temperature sensed by the temperature detector.

30. The method of claim 29, wherein the temperature detector is bonded to the lower surface of the cooktop.

31. The method of claim 29, wherein the temperature detector is urged towards the lower surface of the cooktop via a resilient sensor assembly.

32. The method of claim 29, wherein creating an area of reduced heat flux comprises providing an insulation barrier adjacent to the temperature detector.

33. The method of claim 32, further comprising disposing a radiant shield over the thermal insulation barrier.

34. The method of claim 29, wherein controlling the temperature of the radiant cooktop comprises adjusting the power input to the radiant cooktop based upon the temperature sensed by the temperature detector.

35. The method of claim 29, wherein controlling the temperature of the radiant cooktop comprises controlling a cooking feature of the radiant cooktop based upon the temperature sensed by the temperature detector.

* * * * *